US010598760B2

(12) United States Patent
Seaman et al.

(10) Patent No.: US 10,598,760 B2
(45) Date of Patent: Mar. 24, 2020

(54) DETERMINING LOCATIONS OF CARGO TRANSPORTATION UNITS USING IMAGE DATA

(71) Applicant: BlackBerry Limited, Waterloo (CA)

(72) Inventors: Conrad Delbert Seaman, Ottawa (CA); Stephen West, Manotick (CA); Derek John Kuhn, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 175 days.

(21) Appl. No.: 15/684,089

(22) Filed: Aug. 23, 2017

(65) Prior Publication Data
US 2019/0069139 A1 Feb. 28, 2019

(51) Int. Cl.
*G01S 5/02* (2010.01)
*H04W 4/029* (2018.01)
*G01S 5/00* (2006.01)
*G01S 19/31* (2010.01)
*G01S 19/51* (2010.01)
*G06K 9/00* (2006.01)
*G06Q 10/08* (2012.01)

(52) U.S. Cl.
CPC .......... *G01S 5/0263* (2013.01); *G01S 5/0009* (2013.01); *G01S 5/0018* (2013.01); *G01S 5/0027* (2013.01); *G01S 5/0036* (2013.01); *G01S 5/0284* (2013.01); *G01S 19/31* (2013.01); *G01S 19/51* (2013.01); *G06K 9/00791* (2013.01); *G06Q 10/0833* (2013.01); *H04W 4/029* (2018.02)

(58) Field of Classification Search
CPC ...... G01S 5/0263; G01S 5/0027; G01S 19/51; G01S 5/0284; G01S 19/31; G01S 5/0009; G01S 5/0018; G01S 5/0036; H04W 4/029; G06K 9/00791; G06Q 10/0833
See application file for complete search history.

(56) References Cited

U.S. PATENT DOCUMENTS

| 5,686,902 A  * | 11/1997 | Reis et al. ............... G01S 13/74 340/10.2 |
| 7,319,397 B2 * | 1/2008  | Chung et al. ........... G06K 17/00 340/572.4 |
| 7,475,814 B2   | 1/2009  | Wingo et al. |
| 7,579,965 B2   | 8/2009  | Bucholz |
| 7,839,289 B2 * | 11/2010 | Chung et al. ......... G01S 5/0018 340/572.8 |
| 9,151,692 B2 * | 10/2015 | Breed ..................... G01S 15/04 |
| 9,848,172 B2 * | 12/2017 | DeAngelis et al. .. G01S 3/7865 |

(Continued)

OTHER PUBLICATIONS

Canadian Intellectual Property Office, Transmittal of International Search Report and Written Opinion for PCT/CA2018/050975 dated Nov. 6, 2018 (1 page).

(Continued)

*Primary Examiner* — Dale W Hilgendorf
(74) *Attorney, Agent, or Firm* — Trop, Pruner & Hu, P.C.

(57) ABSTRACT

In some examples, a system includes at least one processor configured to receive, over a network, position data acquired by a position sensor, receive, over the network, an image of a first cargo transportation unit (CTU) acquired by a camera, and determine a location of the first CTU or a second CTU based on the position data and information in the image of the first CTU.

20 Claims, 4 Drawing Sheets

(56) References Cited

U.S. PATENT DOCUMENTS

2008/0303897 A1* 12/2008 Twitchell, Jr. ......... G06Q 10/08
348/61
2017/0351268 A1* 12/2017 Anderson et al. ... G08G 1/0112

OTHER PUBLICATIONS

Canadian Intellectual Property Office, Written Opinion for PCT/CA2018/050975 dated Nov. 6, 2018 (4 pages).
Canadian Intellectual Property Office, Search Report for PCT/CA2018/050975 dated Nov. 6, 2018 (3 pages).
http://www.tracks360.com/tracking-applications/gps-container-tracking-cargo-tracking-container-tracking-devices/—Container Tracking Solutions—RFID GPS Container Tracking System downloaded May 18, 2017 (3 pages).
Tracy Cozzens, Shipping container tracking on verge of big increase, Aug. 31, 2016—http://gpsworld.com/shipping-container-tracking-on-verge-of-big-increase/ (6 pages).
Zenatek—Container Tracking Devices, Monitoring and Reporting Systems—Army Technology—http://www.army-technology.com/contractors/logistics/zenatek/ downloaded May 26, 2017 (5 pages).

* cited by examiner

DETERMINING LOCATIONS OF CARGO TRANSPORTATION UNITS USING IMAGE DATA

BACKGROUND

Moveable platforms (referred to as cargo transportation units or CTUs) can be used to transport cargo that includes goods. Cargo can be transported from an origin (such as a factory, a warehouse, a retail outlet, etc.) to a destination (such as retail outlet, a warehouse, customer premises, etc.) along a route. Determining accurate locations of CTUs can be challenging.

BRIEF DESCRIPTION OF THE DRAWINGS

Some implementations of the present disclosure are described with respect to the following figures.

Figure 1A:
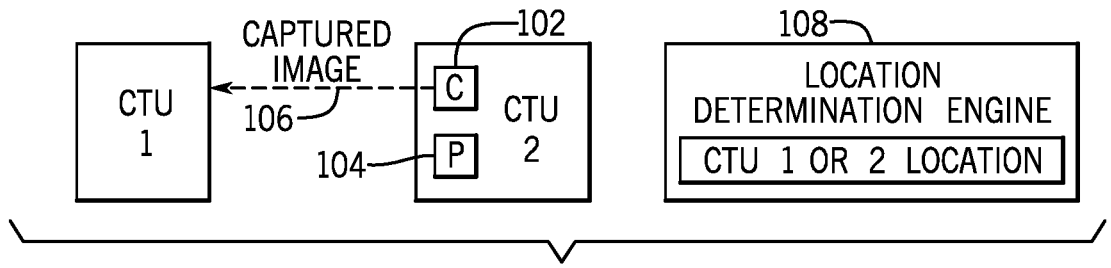
FIGS. 1A-1D illustrate example arrangements for determining locations of cargo transportation units (CTUs), according to various implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cargo transportation unit (CTU) in the form of a moveable platform can be used to carry cargo items between different geographic locations. A "cargo item" can refer to any physical item that is to be delivered from one location to another location. "Cargo" can refer to one or more cargo items. In some examples, a CTU can be a container (that is attached to a tractor), a cargo carrying portion of a truck, or a trailer, where the container provides an enclosed space in which the physical items can be stored during shipment. In other examples, the CTU can include another type of carrier structure that is able to carry cargo items. More generally, the CTU can be part of, mounted on, or attached, as applicable, to a vehicle, such as a truck, a trailer, a tractor, a car, a railed vehicle (e.g., a train), a watercraft (e.g., a ship), an aircraft, a spacecraft, and so forth. The vehicle can haul the CTU that is part of, mounted on, or attached to the vehicle.

In some examples, a vehicle to which a CTU is attached to, mounted on, or part of, can be a driverless vehicle that can be self-driving. A driverless vehicle (also referred to as an "autonomous vehicle") refers to a vehicle that is without a driver, i.e., a human that controls the movement of the vehicle while the driver is located on the vehicle. A self-driving or autonomous vehicle has the intelligence and self-awareness to perform driving tasks, including driving itself from an origin to a destination, without any human driver on the vehicle.

In other examples, CTUs can be hauled by vehicles driven by human drivers.

Some CTUs can include sensor modules including sensors that can be used to determine locations of CTUs. For example, a sensor module can include a global positioning system (GPS) sensor can receive data indicating a position of the GPS sensor. In other examples, other types of position sensors can be used.

Sensor modules that are mounted on CTUs can be powered by batteries or other power sources with a restricted power capacity. When activated, a position sensor can consume a relatively large amount of power, which can quickly deplete a battery or another restricted capacity power source of the sensor module.

To reduce power consumption by a position sensor, the position sensor can be deactivated at certain times, so that the position sensor acquires position data less frequently. However, deactivating a position sensor to reduce power consumption of the position sensor can reduce the accuracy of the position sensor. Therefore, there is a tradeoff between battery life and position sensor accuracy. If the position sensor is continuously activated or activated at more frequent intervals for location tracking, then battery life can be shortened in the electronic device. On the other hand, if the position sensor is activated less frequently, then position accuracy can be degraded, while power consumption of the electronic device can be reduced so that battery life can be extended.

In further examples, CTUs may be located in geographic areas with obstructions (e.g., buildings, trees, geographic terrain, etc.) that can block signals (e.g., GPS signals or other types of signals) that can be used by position sensors to determine CTU locations. The presence of the obstructions can also reduce the accuracy of CTU location determinations using data acquired by position sensors.

In accordance with some implementations of the present disclosure, to more accurately determine a location of a CTU, image data acquired by a camera can be used. Generally, in addition to using position data acquired by a position sensor, the location of a CTU can also be based on image data acquired by a camera on one CTU that captures an image of another CTU or multiple other CTUs (where "another CTU" can refer to one or more other CTUs).

FIGS. 1A-1D show various example arrangements that each includes two CTUs, CTU 1 and CTU 2. Although examples with two CTUs are shown, it is noted that location-determining techniques or mechanisms according to some implementations can be applied to arrangements with more than two CTUs.

In FIG. 1A, it is assumed that CTU 2 has a camera 102 and a position sensor 104. In some examples, the position sensor 104 is a GPS sensor, which can receive signals from satellites of a satellite navigation system. In other examples, the position sensor 104 can be a different type of position sensor, such as a position sensor that is able to measure signals transmitted by base stations or access points, which are fixed-position wireless transmitters whose positions are known. Based on triangulation using signals from multiple fixed-position transmitters, the position sensor 104 is able to determine a position of the CTU 2. Base stations are part of a cellular access network, while access points are part of a wireless local area network (WLAN).

The camera 102 can be any type of image sensor that can be used to capture an image of a target. The captured image can be a color image (that includes colors that are visible to the human eye), a monochrome image, an infrared image, or any other type of image. Although just one camera 102 is shown in the various examples, it is noted that a CTU can also include multiple cameras, possibly different types of cameras (e.g., a first camera to acquire a color image, a second camera to acquire an infrared image, etc.). Similarly, a CTU can also include multiple position sensors.

The camera 102 on CTU 2 captures an image (106) of CTU 1. The position sensor 104 acquires data that indicates the location of CTU 2. Note that the position sensor 104 can be deactivated at certain times to achieve power saving at CTU 2. As a result, the position of the position sensor 104 may not accurately represent a current position of the CTU 2 at a current time (if the position sensor 104 remains deactivated). In other examples, the presence of obstructions may interfere with the accuracy of the position sensor 104.

FIG. 1A further shows a location determination engine 108, which can be separate from CTU 1 and CTU 2. For example, the location determination engine 108 can be part of a remote server (e.g., web server, cloud server, etc.) that is able to communicate with CTUs, such as to receive image data acquired by the camera 102 and position data acquired by the position sensor 104. A "server" can be implemented with a computer or a distributed arrangement of computers.

As used here, the term "engine" can refer to a hardware processing circuit, such as a microprocessor, a core of a multi-core microprocessor, a microcontroller, a programmable integrated circuit device, a programmable gate array, or any other type of hardware processing circuit. In other examples, the term "engine" can refer to a combination of a hardware processing circuit and machine-readable instructions executable on the hardware processing circuit.

The location determination engine 108 can determine the location of CTU 1 or CTU 2 based on the image data from the camera 102 and the position data from the position sensor 104, which in the example of FIG. 1A are both part of CTU 2. In examples where the location determination engine 108 determines the location of CTU 2, the location of CTU 1 can be known to the location determination engine 108, and it is assumed that the position data acquired by the position sensor 104 may not be accurate, either because the position sensor 104 has been deactivated (turned off or placed into a lower power state) for some amount of time, or there are obstructions that interfere with the accuracy of the position sensor 104.

The image (106) of CTU 1 acquired by the camera 102 can include information identifying CTU 1 or its location. For example, the image (106) can include a license plate of CTU 1, a trailer number or other identifier of CTU 1, an identifier of a parking location (e.g., parking space number, row number, loading dock number, etc.) in which CTU 1 is parked, and so forth. Optical processing techniques can be used to recognize identifier information in a captured image of a CTU.

The known location of CTU 1 can be based on prior measurements made with respect to CTU 1, such as by a position sensor of CTU 1. For example, the position sensor of CTU 1 may indicate that the same position data has been acquired at multiple time instances, which can indicate that CTU 1 is stationary (e.g., parked at some location), so that the position acquired by the position sensor of CTU 1 may be reliable. Alternatively, the location determination engine 108 may have previously determined the location of CTU 1 using techniques according to some implementations of the present disclosure, such that the location determination engine 108 can rely upon the accuracy of the determined location of CTU 1.

More generally, the location determination engine 108 can select use of the position data acquired by the position sensor that is part of a CTU that has been stationary for longer than a specified time duration or that otherwise is determined to be reliable.

CTU 1 may be in close proximity to CTU 2 (CTU 1 and CTU 2 are within a specified distance of each other such that the camera 102 of CTU 2 is able to capture an image of CTU 1). The distance between CTU 1 and CTU 2 can be based on analysis of the captured image 106, which can be used by the location determination engine 108 to determine the relative distance between CTU 1 and CTU 2.

The relative distance between CTU 1 and CTU 2 that is computed by the location determination engine 108 based on the image of CTU 1 can be based on a known size of CTU 1. For example, the location determination engine 108 can have access to a data repository that stores facts about CTUs, where the facts include sizes of the CTUs. The sizes can include a length of a CTU, a height of the CTU, or any other dimension of the CTU. Based on the information and the image of the CTU in the image data acquired by the camera 102, the location determination engine 108 can determine an angle of CTU 1 relative to CTU 2, and compute the relative distance based on the angle and the size of CTU 1 in the image.

The location determination engine 108 can determine the location of CTU 2 based on the relative distance and the position of CTU 1. In some examples, the location determination engine 108 can compare the position indicated by the position sensor 104 with a position calculated by the location determination engine 108 from the known (previously stored) location of CTU 1. This comparing can allow the location determination engine 108 to verify that the location of CTU 2 calculated based on the image data of CTU 1 is reasonable. For example, if the comparing indicates there is a discrepancy between these two positions, then the location determination engine 108 can decide to use one or the other position, based on which position is determined to be more reliable. For example, the position data acquired by the position sensor 104 may be deemed less reliable if the position sensor 104 has been deactivated for a relatively long period of time (e.g., longer than a specified time interval) if CTU 2 was in motion at any part of that time duration. Alternatively, the position data acquired by the position sensor 104 may be deemed less reliable if CTU 2 provides some indication to the location determination engine 108 that CTU 2 is experiencing interference with signals of the position sensor 104 caused by an obstruction.

Generally, the location determination engine 108 combines the estimated position of CTU 2 based on the captured image 106 of CTU 1 and the position data of the position sensor 104 to make a determination of the location of CTU 2. This combining can include selecting one of the positions, or some other type of combination, including computing an average of the positions, or computing another mathematical aggregate of the positions.

In other examples, according to FIG. 1A, the location determination engine 108 can determine the location of CTU 1 based on the captured image 106 as captured by the camera 102 of CTU 2 and on the position data acquired by the position sensor 104 of CTU 2. In such examples, CTU 1 may be without any type of sensor, so that the location determination engine 108 determines the location of CTU 1 by: (1) determining the location of CTU 2 based on the position data of the position sensor 104, and (2) determine the relative distance between CTU 1 and CTU 2, and using that determined distance and the location of CTU 2 to estimate the location of CTU 1.

Figure 1B:
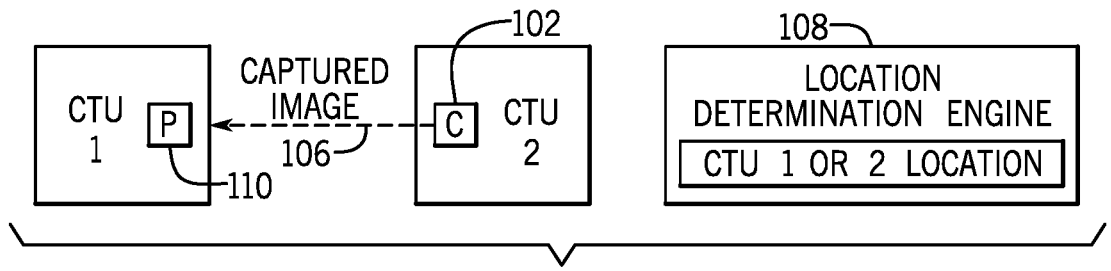
Figure 1C:
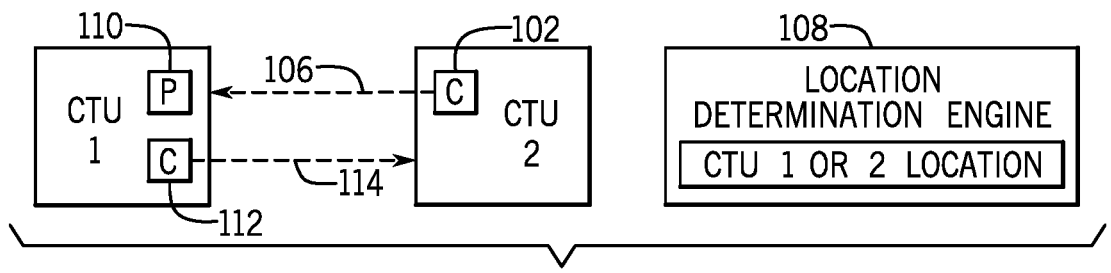

FIG. 1B shows another example arrangement, where CTU 1 has a position sensor 110 and CTU 2 has the camera 102. In the example of FIG. 1B, the camera 102 of CTU 2 is able to capture an image (106) of CTU 1.

In the example of FIG. 1B, the location determination engine 108 can determine the location of CTU 1 or CTU 2 based on the position data acquired by the position sensor 110 and the captured image 106 captured by the camera 102, where the position sensor 110 and the camera 102 are located in respective different CTUs. For example, to determine the location of CTU 2 (which may not include a position sensor), the location determination engine 108 can determine the location of CTU 1 based on the position data of the position sensor 110 of CTU 1, and can determine the relative distance between CTU 1 and CTU 2 based on the captured image 106 of CTU 1 as captured by the camera 102 of CTU 2. Using the relative distance between CTU 1 and CTU 2 and the location of CTU 1, the location determination engine 108 can estimate the location of CTU 2.

As further examples, the arrangement of FIG. 1B can be used to determine the location of CTU 1. To do this, the location determination engine 108 has a stored location of CTU 2 that was previously determined. The location determination engine 108 uses the captured image 106 of CTU 1 as captured by the camera 102 of CTU 2 to determine the relative distance between CTU 1 and CTU 2. The location determination engine 108 can then determine an image-based location of CTU 1 using the stored location of CTU 2 and the relative distance between CTU 1 and CTU 2.

FIG. 10 shows another example arrangement where CTU 1 has the position sensor 110 and a camera 112, and CTU 2 has the camera 102. In FIG. 10, the camera 102 of CTU 2 can capture an image 106 of CTU 1, and the camera 112 of CTU 1 can capture an image 114 of CTU 2. The two captured images 106 and 114 can then be used to determine the relative distance between CTU 1 and CTU 2. For example, an average or other mathematical aggregate of the distance computed based on the captured image 106 and the distance based on the captured image 114 can be calculated. The position sensor 110 of CTU 1 is able to acquire position data of CTU 1. The location determination engine 108 can determine the location of CTU 1 or CTU 2 using the position data acquired by the position sensor 110, and the image data 106 and 114.

Figure 1D:
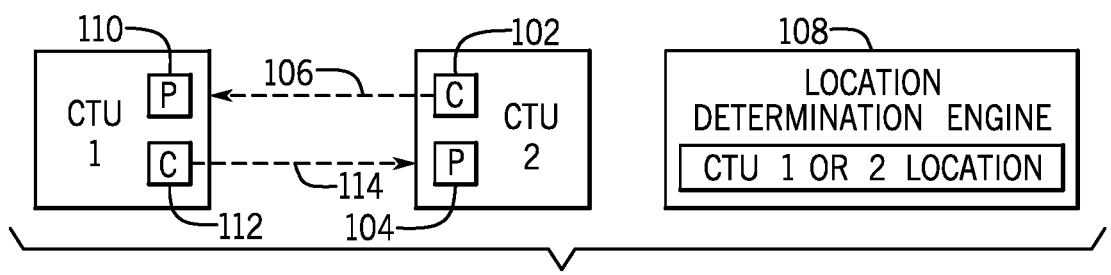

FIG. 1D shows another example arrangement in which CTU 1 has the position sensor 110 and the camera 112, and CTU 2 has the camera 102 and the position sensor 104. The camera 102 of CTU 2 can acquire an image of CTU 1, and the camera 112 of CTU 1 can acquire an image 114 of CTU 2. The location determination engine 108 can determine the location of CTU 1 or CTU 2 based on the position data acquired by the position sensor 110 of CTU 1, the position data acquired by the position sensor 104 of CTU 2, and the image data 106 and 114.

Although FIGS. 1A-1D depict some example arrangements, it is noted that in other examples, there can be other arrangements of CTUs with position sensors and/or cameras.

In additional examples, one CTU can cause another CTU to acquire image data for use in determining a CTU location. For example, in FIG. 1A, CTU 1 can initiate a trigger to cause the camera 102 of CTU 2 to capture the image (106) of CTU 1. For example, CTU 1 may detect that CTU 1 is in proximity to CTU 2 (such as based on direct communications between CTU 1 and CTU 2) or based on information provided to CTU 1 from a remote source, such as the location determination engine 108 or another source. To initiate a location determination of CTU 1, CTU 1 can send a trigger indication to CTU 2 to cause the camera 102 of CTU 2 to acquire the image (106) of CTU 1, and the position sensor 104 to acquire position data of CTU 2. The trigger indication can also cause CTU 2 to send the acquired image (106) and the position data to the location determination engine 108 for use in determining the location of CTU 1.

CTU 1 can send the trigger indication if CTU 1 is without a position sensor, or CTU 1 has determined that interference, a fault, or a low power condition has caused a position sensor in CTU 1 to no longer be reliable.

In other examples, CTU 1 can send the trigger indication to the location determination engine 108, which in turn sends a trigger indication to CTU 2 to cause CTU 2 to acquire the image (106) of CTU 1, and the position sensor 104 to acquire position data of CTU 2.

Figure 2:
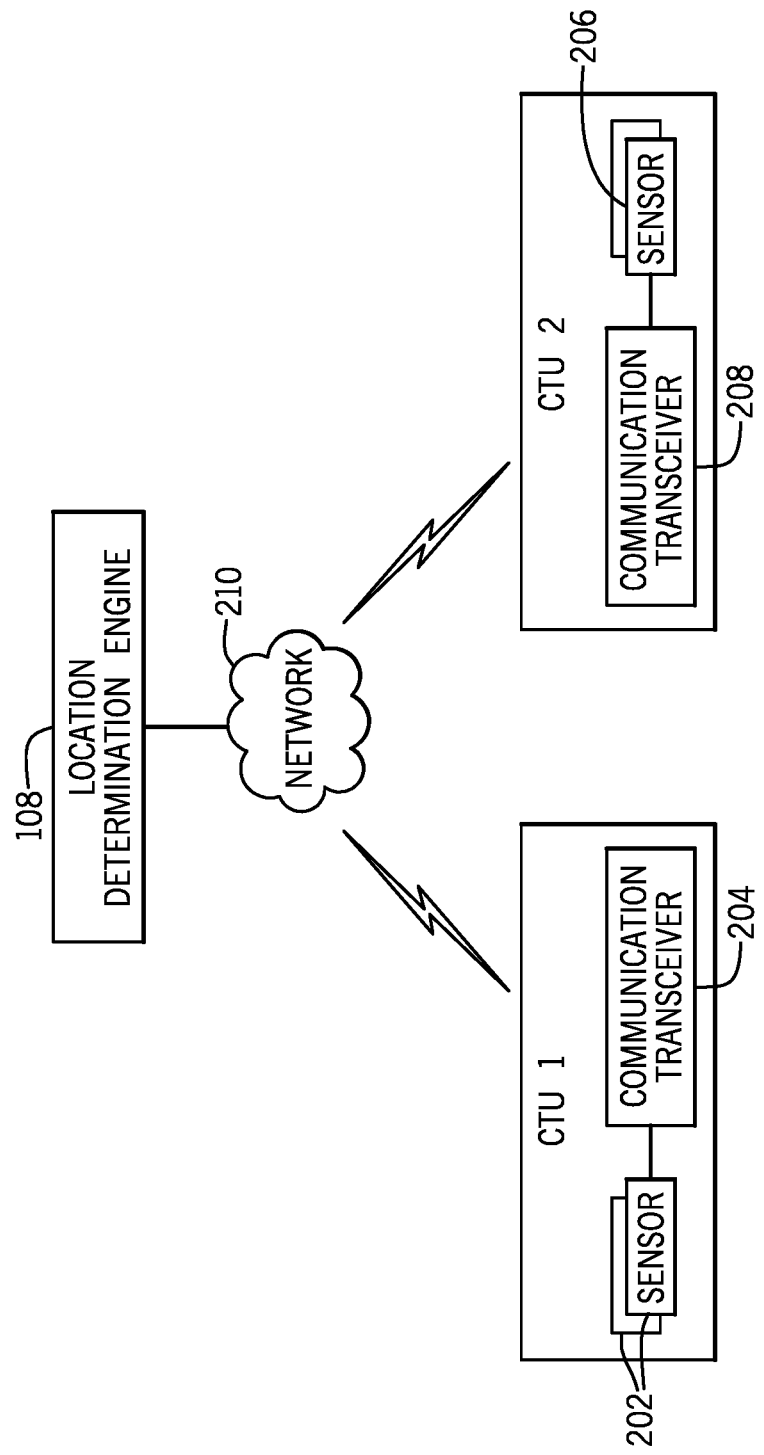
FIG. 2 is a block diagram of an example arrangement including CTUs and a location determination engine, according to further implementations.

FIG. 2 is a block diagram of an example arrangement that includes CTU 1, CTU 2, and the location determination engine 108. CTU 1 includes sensors 202, which can include any or some combination of the following: a position sensor, a camera, and a further sensor. The further sensor (or multiple further sensors) can be used to acquire one or more other parameters associated with CTU 1. For example, the further sensor(s) can include one or more of the following: an accelerometer, a gyroscope, a magnetometer, a temperature sensor, a humidity sensor, a pressure sensor, a sensor to measure an operating condition of the CTU (e.g., a wear level of a brake, a tire pressure, a fluid level, etc.), or any other type of sensor.

CTU 1 further includes a communication transceiver 204 to communicate over a network 210 with the location determination engine 108.

The network 210 can be a wireless network. Examples of a wireless network include a cellular network, a WLAN, and so forth. The communication transceiver 204 can communicate radio frequency (RF) signals over a wireless network, such as RF signals used in a cellular network or a WLAN.

An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks. In additional examples, a wireless network can include a WLAN, which can operate according to the Institute of Electrical and Electronic Engineers (IEEE) 802.11 or Wi-Fi Alliance Specifications. In other examples, other types of wireless networks can be employed by the CTU controller 108 to communicate with a remote service, such as a BLUETOOTH link, a ZIGBEE network, and so forth. Additionally, some wireless networks can enable cellular IoT, such as wireless access networks according to LTE Advanced for Machine-Type Communication (LTE-MTC), narrowband IoT (NB-IoT), and so forth.

CTU 2 also includes sensors 206, which can include any or some combination of the following: a position sensor, a camera, and a further sensor. CTU 2 also includes a communication transceiver 208 to communicate over the network 210. Using the communication transceiver 204 or 208, CTU 1 or CTU 2 can communicate sensor data as acquired by the sensors 202 or 206 over the network 210 to the location determination engine 108.

In further examples, at least one of the CTUs can be implemented without any sensors.

Figure 3:
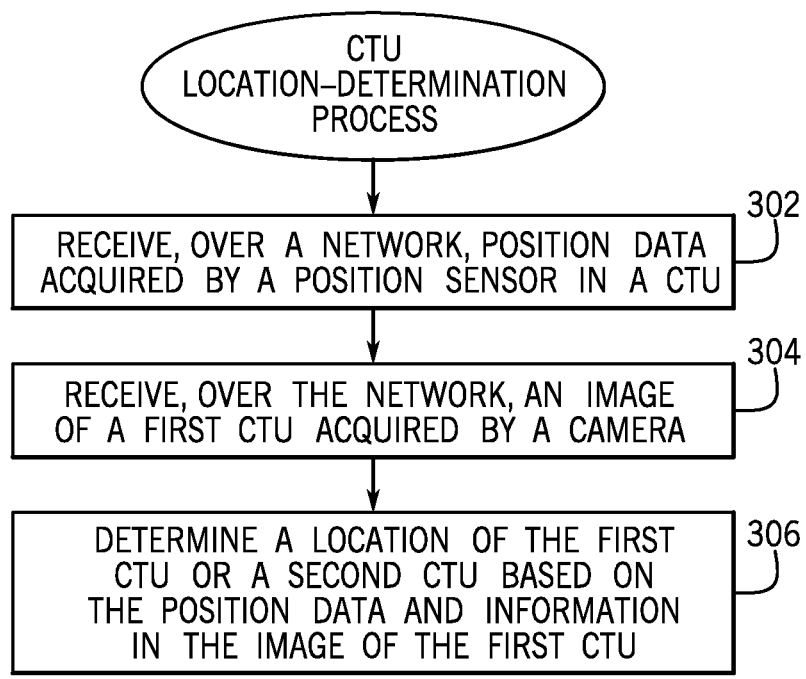
FIG. 3 is a flow diagram of a process of determining a location of a CTU, according to some implementations.

FIG. 3 is a flow diagram of a CTU location-determination process according to some implementations. The CTU location-determination process can be performed by the location determination engine 108.

The CTU location-determination process receives (at 302), over a network (e.g., 210 in FIG. 2), position data acquired by a position sensor in a CTU. The CTU location-determination process further receives (at 304), over the network, an image of a first CTU acquired by a camera. In addition, the CTU location-determination process determines (at 306) a location of the first CTU or a second CTU based on the position data and information in the image of the first CTU.

Although reference is made receiving position data of a position sensor in a CTU, it is noted that in other examples, position data of position sensors in multiple respective CTUs can be received by the CTU location-determination process and used in determining a CTU location.

Similarly, multiple images of multiple CTUs acquired by respective cameras can be received by the CTU location-determination process and used in determining a CTU location. In such examples, the images from multiple cameras can be overlapped (e.g., stitched together) to obtain a larger image of CTUs. From the larger image, relative positions of CTUs in the larger image can be determined, and such relative positions can be used to confirm the locations of CTUs estimated by the CTU location-determination process according to some examples of the present disclosure.

In further examples, the CTU location-determination process can determine the location of a CTU that is without a position sensor and/or is without a communication capability to communicate with the location determination engine 108. Such a CTU can be referred to as a "non-connected CTU." In such examples, the CTU location-determination process can estimate positions of non-connected CTUs based on position data acquired by position sensors of "connected CTUs" (which are CTUs with positions sensors and communication transceivers to communicate with the location determination engine 108), and image data acquired by cameras of the non-connected CTUs.

In generally, the location determination engine 108 according to some implementations of the present disclosure is able to generate a location map of CTUs (connected CTUs and/or non-connected CTUs) using determined locations of the CTUs estimated based on image data and position sensors. The location map can be gradually built up as image data of CTUs and position data of CTUs are received by the location determination engine 108.

By automatically building the location map of CTUs, a manual check of CTUs by humans can be avoided. For example, the location map of CTUs can be used to confirm locations of CTUs in a specified location, such as within a dock yard or parking lot (or within an area relative to a specified geographic fence).

Image data of CTUs can also be used to confirm other information associated with CTUs, such as an altitude of the CTUs, stacking of CTUs (i.e., whether one CTU is stacked on top of another CTU), orientations of CTUs (e.g., orientation relative to north), conditions of CTUs (e.g., whether the CTUs are in good condition, such as no damage due to a crash), and so forth. Such other information can be added to the location map and associated with each CTU identified by the location map.

Figure 4:
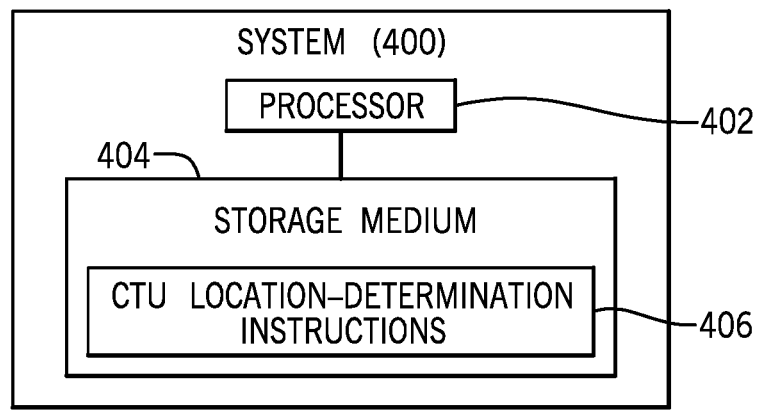
FIG. 4 is a block diagram of a system according to further implementations.

FIG. 4 is a block diagram of a system 400 that includes a processor 402. A processor can include a microprocessor, a core of a multi-core microprocessor, a microcontroller, a programmable integrated circuit, a programmable gate array, or another hardware processing circuit. The system 400 further includes a non-transitory machine-readable or computer-readable storage medium 404 that stores CTU location-determination instructions 406, which are executable on the processor 402 to determine locations of CTUs as discussed above.

Figure 5:
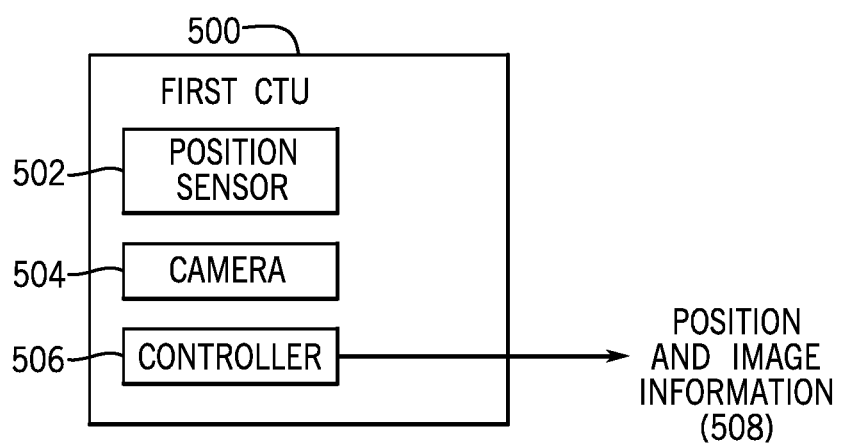
FIG. 5 is a block diagram of a CTU according to alternative implementations.

FIG. 5 is a block diagram of a first CTU 500 according to some implementations. The first CTU 500 includes a position sensor 502 that is activated intermittently and deactivated during respective time intervals. The first CTU 500 further includes a camera 504.

In addition, the first CTU 500 includes a controller 506 configured to receive, responsive to an indication of a second CTU, a trigger to activate the position sensor and the camera. The indication of the second CTU can be sent as the trigger directly from the second CTU to the first CTU. Alternatively, the indication of the second CTU can be sent to a remote service (such as the location determination engine 108 of FIG. 1), which in turn sends the trigger to the first CTU 500.

In response to the received trigger, the controller 506 causes the position sensor 502 to acquire position information, causes the camera 504 to capture an image of the second CTU, and sends, over a network to the remote service, the position information and the image of the second CTU (collectively position and image information 508) to cause the remote service to determine a location of the second CTU. The position and image information 508 can be transmitted by a communication transceiver (not shown) of the first CTU 500.

In various examples, machine-readable instructions of various devices or systems can be stored in a storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital versatile disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
   at least one processor configured to:
   receive, over a network, position data acquired by a position sensor;
   receive, over the network, an image of a first cargo transportation unit (CTU) acquired by a camera on a second CTU in response to a trigger initiated by the first CTU; and
   determine a location of the first CTU or the second CTU based on the position data and information in the image of the first CTU.

2. The system of claim 1, wherein the determining of the location is further based on a stored location of the first CTU captured in the image.

3. The system of claim 1, wherein the received position data was acquired by the position sensor on the second CTU, and the determined location is of the second CTU.

4. The system of claim 1, wherein the received position data was acquired by the position sensor on the first CTU, and the determined location is of the second CTU.

5. The system of claim 1, wherein the received position data was acquired by the position sensor on the second CTU, and the determined location is of the first CTU.

6. The system of claim 1, wherein the received position data was acquired by the position sensor on the first CTU, and the determined location is of the first CTU.

7. The system of claim 1, wherein the at least one processor is configured to:
   receive, over the network, images of a plurality of CTUs acquired by one or more cameras, the plurality of CTUs including the first CTU; and
   determine the location of the first CTU or the second CTU based on the position data and information in the images of the plurality of CTUs.

8. The system of claim 1, wherein the determining of the location of the first CTU or the second CTU is based on information in the image of the first CTU that identifies the first CTU or a known location of the first CTU.

9. The system of claim 1, wherein the first CTU is without the position sensor or is without a communication capability to communicate with the system, and the determined location is of the first CTU.

10. The system of claim 1, wherein the at least one processor is configured to:
    generate a map of CTUs using determined locations of the CTUs, the determined locations comprising the location of the first CTU or the second CTU.

11. The system of claim 1, wherein the at least one processor is configured to further:
    determine a distance between the first CTU and the second CTU,
    wherein the determined location of the first CTU or the second CTU is further based on the determined distance.

12. The system of claim 11, wherein the determined distance is based on information of a size of the first CTU stored in a data repository.

13. A system comprising:
    at least one processor configured to:
    receive, over a network, position data acquired by a position sensor;
    receive, over the network, an image of a first cargo transportation unit (CTU) acquired by a camera;
    determine a location of the first CTU or a second CTU based on the position data and information in the image of the first CTU; and
    select a use of the position data acquired by the position sensor that is part of a CTU that has been stationary for longer than a specified time duration.

14. The system of claim 13, wherein the received image was acquired by a camera on the second CTU in response to a trigger initiated by the first CTU.

15. A non-transitory machine-readable storage medium storing instructions that upon execution cause a system to:
    receive, over a network, position data acquired by a position sensor;
    receive, over the network, an image of a first cargo transportation unit (CTU) acquired by a camera on a second CTU in response to a trigger initiated by the first CTU; and
    determine a location of the first CTU or the second CTU based on the position data and information in the image of the first CTU.

16. The non-transitory machine-readable storage medium of claim 15, wherein the position data is acquired by the position sensor that is battery powered and deactivated at respective time intervals.

17. The non-transitory machine-readable storage medium of claim 15, wherein the information in the image of the first CTU comprises information to identify the first CTU or the location of the first CTU, the determined location is of the second CTU, and determining the location of the second CTU uses a stored location of the first CTU based on the information in the image of the first CTU.

18. The non-transitory machine-readable storage medium of claim 15, wherein the determined location is of the first CTU, and wherein the first CTU is without the position sensor.

19. A first cargo transportation unit (CTU) comprising:
    a position sensor that is activated intermittently and deactivated during respective time intervals;
    a camera; and
    a controller configured to:
    receive, responsive to an indication of a second CTU, a trigger to activate the position sensor and the camera, and
    in response to the received trigger:
    cause the position sensor to acquire position information,
    cause the camera to capture an image of the second CTU, and
    send, over a network to a remote service, the position information and the image of the second CTU to cause the remote service to determine a location of the second CTU.

20. The first CTU of claim 19, further comprising a wireless transceiver to send the position information and the image of the second CTU wirelessly over the network.

* * * * *